United States Patent
Strasser

(10) Patent No.: US 7,164,120 B2
(45) Date of Patent: Jan. 16, 2007

(54) POSITION MEASURING INSTRUMENT

(75) Inventor: Erich Strasser, Trostberg (DE)

(73) Assignee: Dr. Johannes Heidenhain GmbH, Traunreut (DE)

( * ) Notice: Subject to any disclaimer, the term of this patent is extended or adjusted under 35 U.S.C. 154(b) by 129 days.

(21) Appl. No.: 10/669,149

(22) Filed: Sep. 23, 2003

(65) Prior Publication Data

US 2004/0129870 A1    Jul. 8, 2004

(30) Foreign Application Priority Data

Sep. 23, 2002   (DE)   ................................ 102 44 234

(51) Int. Cl.
G01D 5/34      (2006.01)
G01J 9/00      (2006.01)

(52) U.S. Cl. .................... 250/231.16; 250/231.13; 250/231.14; 250/231.18; 356/616; 356/617

(58) Field of Classification Search ............................. 250/231.1–231.18, 237 G; 356/616, 617; 341/11, 13
See application file for complete search history.

(56) References Cited

U.S. PATENT DOCUMENTS

| | | | | |
|---|---|---|---|---|
| 4,691,101 A * | 9/1987 | Leonard | ................ | 250/231.16 |
| 5,252,825 A | 10/1993 | Imai et al. | | |
| 5,260,568 A * | 11/1993 | Ieki | ........................ | 250/231.18 |
| 5,841,133 A * | 11/1998 | Omi | ....................... | 250/231.13 |
| 6,031,224 A * | 2/2000 | Peterlechner | .......... | 250/231.13 |
| 6,355,927 B1 * | 3/2002 | Snyder | ................... | 250/231.13 |
| 6,392,224 B1 * | 5/2002 | Holzapfel et al. | ..... | 250/231.13 |
| 6,452,159 B1 * | 9/2002 | Holzapfel et al. | ..... | 250/231.13 |
| 6,472,658 B1 * | 10/2002 | Mayer et al. | ........... | 250/237 G |
| 6,590,201 B1 * | 7/2003 | Ueda | ..................... | 250/231.13 |
| 6,816,091 B1 * | 11/2004 | Chee | ........................... | 341/13 |
| 6,867,412 B1 * | 3/2005 | Patzwald et al. | ....... | 250/231.13 |
| 2004/0245442 A1 * | 12/2004 | Gruber et al. | ......... | 250/231.13 |
| 2005/0006571 A1 * | 1/2005 | Keong | ................... | 250/231.13 |

FOREIGN PATENT DOCUMENTS

| | | |
|---|---|---|
| DE | 41 23 722 A1 | 1/1992 |
| EP | 1 111 345 A2 | 6/2001 |

\* cited by examiner

*Primary Examiner*—Stephone B. Allen
*Assistant Examiner*—Davienne Monbleau
(74) *Attorney, Agent, or Firm*—Brinks Hofer Gilson & Lione

(57) ABSTRACT

A method for position measurement that includes scanning a plurality of graduation periods of one incremental graduation by a detector arrangement extending over a length of one measurement range, a reference marking being integrated with one of the graduation periods, and generating a plurality of periodic scanning signals, of which at least one is locally modified by the reference marking. The method includes detecting the at least one scanning signal, modified by the reference marking, from among the plurality of periodic scanning signals. The method further includes determining an absolute position of the reference marking within the length of said measurement range as a function of the scanning signal detected.

19 Claims, 9 Drawing Sheets

POSITION MEASURING INSTRUMENT

Applicant claims, under 35 U.S.C. §119, the benefit of priority of the filing date of Sep. 23, 2002 of a German patent application, copy attached, Serial Number 102 44 234.7, filed on the aforementioned date, the entire contents of which is incorporated herein by reference.

BACKGROUND OF THE INVENTION

1. Field of the Invention

The present invention relates to a position measuring instrument for determining the absolute position and to a method for absolute position measurement.

2. Discussion of Related Art

In many fields, for determining the position of two bodies moved toward one another, absolute position measuring instruments are increasingly being used. Absolute position measuring instruments have the advantage over systems that measure purely incrementally that in every relative position, even after the energy supply has been interrupted, a correct position information can be output immediately.

The absolute position is embodied by a code, which is arranged in a plurality of tracks extending parallel to one another, for instance in the form of a gray code.

Arranging the position information in a single code track, with code elements in line with one another in the measurement direction, is especially space-saving. The code elements are disposed in line with one another in a pseudo-random distribution, so that a certain number of successive code elements each form one bit pattern that unambiguously defines the absolute position. When the scanning instrument is shifted by a single code element, a new bit pattern is already formed, and over the entire measurement range to be detected in absolute form, a sequence of different bit patterns is available. This kind of sequential code is known as a chain code or a pseudo-random code.

In both multitrack and single-track absolute coding, it is a problem to achieve a space-saving layout on the one hand and high resolution on the other.

To enhance the resolution in sequential absolute coding, it is usual to provide at least one incremental graduation in addition. The period of this incremental graduation must be adapted to the length of a code element, or in other words to the maximum possible increment width or resolution of the code. As explained in German Patent Disclosure DE 41 23 722 A1, the graduation period or incremental graduation should be selected to exactly match the increment width of the code. To further enhance the resolution, a second incremental track is required, whose graduation period is a fraction of the graduation period of the first incremental track. To enhance the resolution of the absolute position measurement, that is, the subdivision of the increment width of the code, a plurality of incremental tracks disposed side by side are thus necessary.

This arrangement has the disadvantage that a space-saving layout is not possible, and that the scanning elements of the two incremental tracks are spaced apart from one another perpendicular to the measurement direction, and as a consequence the arrangement is vulnerable to rotations of the scanning unit (known as moiré fluctuations). Upon rotations between the scanning unit and the incremental graduations, the requisite synchronization of the scanning signals, derived from the two incremental tracks, is no longer assured.

For this reason, European Patent Disclosure EP 1 111 345 A2 has proposed disposing, besides the absolute code, only a single incremental graduation, which however has two different graduation periods. A detector arrangement is designed to generate a first incremental signal with a coarse signal period and a second incremental signal with a fine signal period, that is, incremental signals that are required for synchronization in the apparatus of DE 41 23 722 A1. A prerequisite for this synchronization is an interpolation of the incremental signals with the coarse signal period, which is why EP 1 111 345 A2 lists various provisions for filtering, in order to derive an interpolatable incremental signal with the coarse signal period from the incremental track. The provisions for generating two highly interpolatable incremental signals of EP 1 111 345 A2 require relatively great effort and expense.

OBJECT AND SUMMARY OF THE INVENTION

It is therefore an object of the present invention to disclose an absolute position measuring instrument which is compact in structure and with which a high-resolution absolute position measurement that is as accurate as possible can be achieved in a simple way.

This object is attained by a position measuring instrument that includes a periodic incremental graduation having a plurality of graduation periods within one measurement range and a reference marking disposed within the measurement range and integrated with the incremental graduation. An arrangement of detector elements over at least a length of the measurement range for generating a plurality of periodic scanning signals of which at least one is modified locally by the reference marking. An evaluation device that receives the scanning signals and detects at least one scanning signal, modified by the reference marking, from the plurality of scanning signals and determines an absolute position of the reference marking within the length of the measurement range as a function of the detected at least one scanning signal.

It is also an object of the present invention to disclose a method for determining an absolute position with which the most highly accurate and high-resolution position measurement possible is enabled.

This object is attained by a method for position measurement that includes scanning a plurality of graduation periods of one incremental graduation by a detector arrangement extending over a length of one measurement range, a reference marking being integrated with one of the graduation periods, and generating a plurality of periodic scanning signals, of which at least one is locally modified by the reference marking. Detecting the at least one scanning signal, modified by the reference marking, from among the plurality of periodic scanning signals. Determining an absolute position of the reference marking within the length of said measurement range as a function of the scanning signal detected.

Further advantages, as well as details of the present invention ensue, from the subsequent description of exemplary embodiments by the attached drawings.

DETAILED DESCRIPTION OF THE PREFERRED EMBODIMENTS

Figure 1:
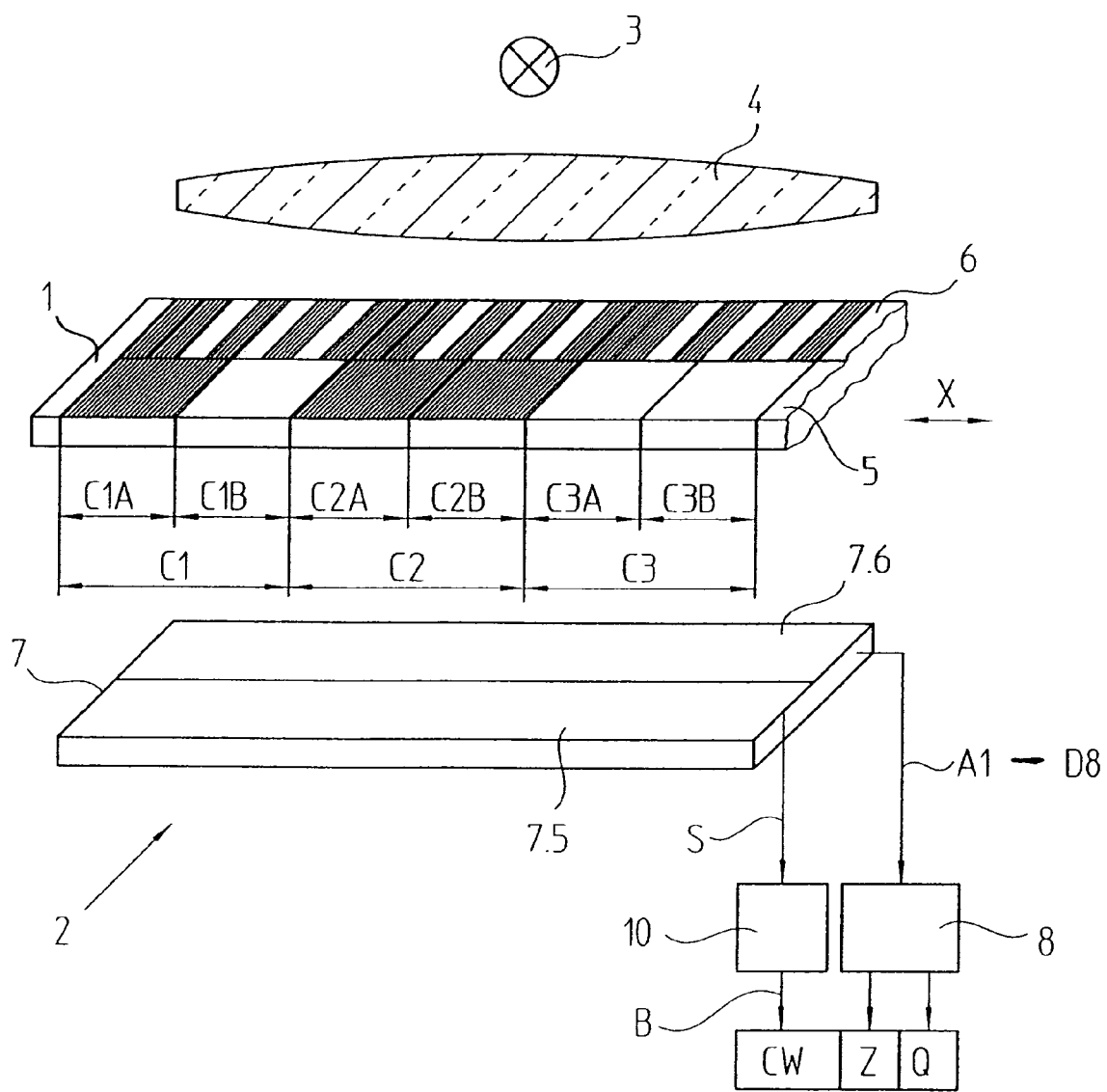
FIG. 1 schematically shows an embodiment of a position measuring instrument with a code track and an incremental track in accordance with the present invention.

In FIG. 1, a position measuring instrument designed according to the present invention is illustrated in the form of a length measuring instrument. This position measuring instrument operates by the optical scanning principle, in which a scale 1 is scanned by a scanning device 2, which is arranged to be movable in the measurement direction X relative to the scale 1.

The basic layout is equivalent to a conventional position measuring instrument as shown for instance in DE 41 23 722 A1. The scanning device 2 includes a light source 3, whose light, via a collimator lens 4, illuminates a plurality of code track 5 and incremental graduation 6. The light is modulated as a function of position by the code track 5 and incremental graduation 6, so that downstream of the code track 5 and incremental graduation 6, a position-dependent light distribution occurs that is detected by the detector unit 7 of the scanning device 2.

The code track 5, in the example shown, is a sequential code, which includes a series of equal-length code elements C1, C2, C3 disposed in line with one another in the measurement direction X. The length of a code element C1, C2, C3 is equivalent to the increment width within which an absolute position can be determined unambiguously.

To make the absolute position measurement especially secure against malfunction, each code element C1, C2, C3 in turn includes two partial regions C1A, C1B; C2A, C2B; C3A, C3B of equal length in the measurement direction X, disposed side by side and in immediate succession with one another and embodied in complementary form to one another. Complementary here means that they have inverse properties; that is, for the optical scanning principle, they are transparent and nontransparent, or with incident-light scanning, they are reflective and nonreflective, respectively. Such a code is also known as a Manchester code.

The detector unit 7 includes a detector arrangement 7.5, with a series of detector elements D1–D11 (shown in detail in FIGS. 2 and 7) disposed in the measurement direction X. In every relative position, at least one detector element D1–D11 is associated unambiguously with each partial region C1A, C1B of a code element C1, so that in every relative position of the detector unit 7 relative to the code track 5, a scanning signal S is obtained from each partial region C1A, C1B. These scanning signals S are delivered to an evaluation device 10, which assigns a digital value B=0 or B=1 to each code element C1, C2, C3. In the Manchester code 5, the digital value B is dependent on the order of the partial regions C1A and C1B. For instance, the order C1A=opaque and C1B=transparent means the digital value is B1=0, and the order C2A=transparent and C2B=opaque means the digital value is B2=1. An especially malfunction proof formation of the digital value B is achieved by finding the difference between the scanning signals of successive partial regions C1A, C1B of a code element C1, as will be described in further detail hereinafter.

The detector arrangement 7.5 is designed for simultaneously scanning a plurality of successive code elements C1, C2, C3. A series of a plurality of digital values B1, B2, B3 yields a code word CW, which defines the absolute position. Upon a displacement of the detector unit 7 relative to the scale 1 by the width or length of a code element C1, C2, C3, a new code word CW is generated, and over the distance or angle to be measured in absolute form, many different code words CW are formed.

To increase the resolution, or in other words further subdivide an increment width of the absolute position measurement, an incremental graduation 6 is disposed parallel to and next to the code track 5. The length of one graduation period P is a fraction of the length of one code element C1, C2, C3.

Figure 2:
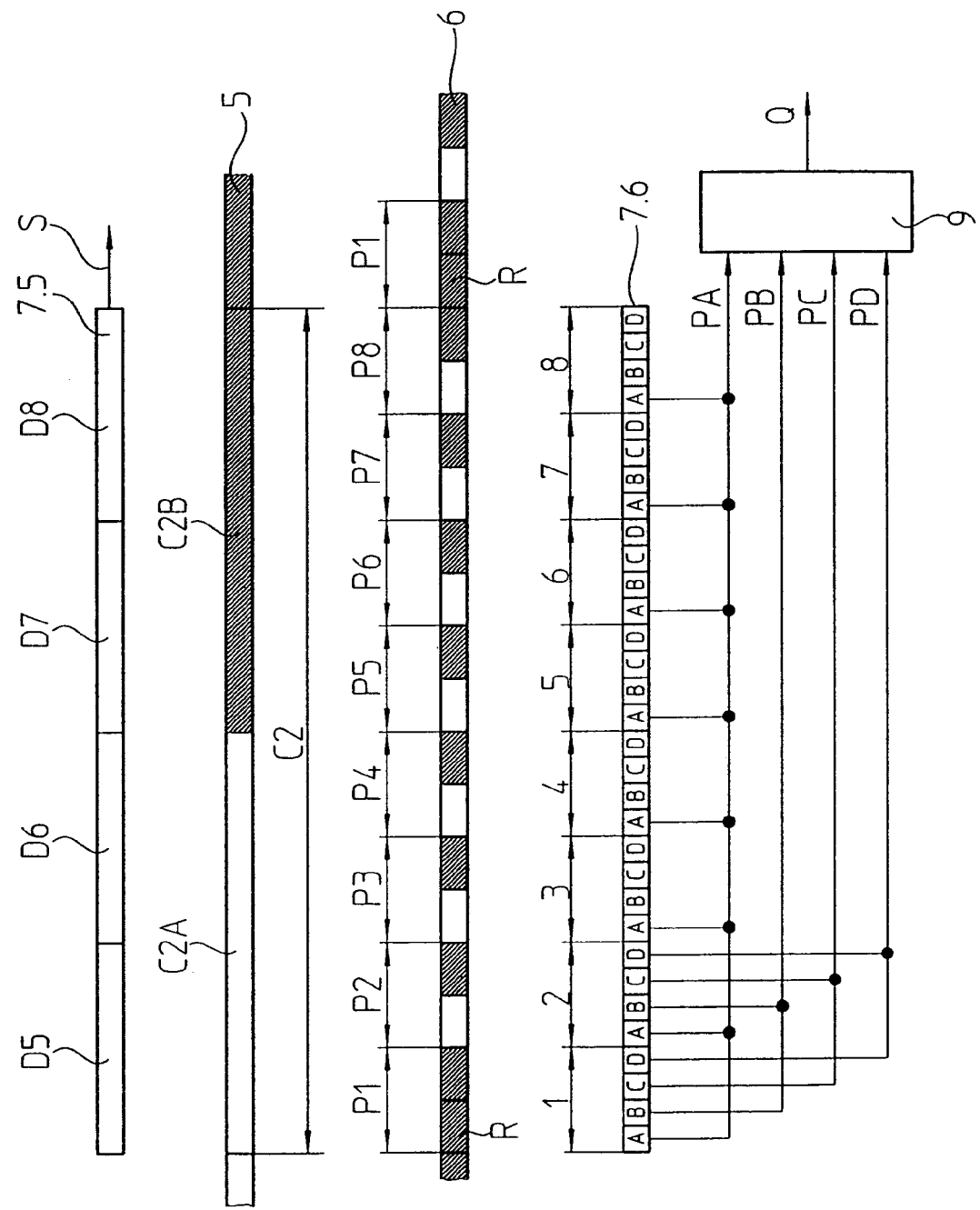
FIG. 2 shows the arrangement of detector elements relative to the code track and to the incremental track of the position measuring instrument of FIG. 1 for generating scanning signals.

FIG. 2 shows a detail of the position measuring instrument of FIG. 1 schematically. This illustration clearly shows the association of the code track 5 and incremental graduation 6 with one another and with the detector arrangements 7.5 and 7.6.

The incremental graduation 6 is scanned in a known manner; one detector element A, B, C, D of detector arrangement 7.6 is assigned each graduation period P, at a mutual spacing of one quarter of the graduation period. The detector elements A, B, C, D generate four interpolatable sine-wave analog signals A1–D8 in phase quadrature (phase offset 90° from one another). Eight graduation periods P1–P8 are disposed parallel to the code element C2. The detector element arrangement A, B, C, D is located in each graduation period P1–P8. In-phase detector elements A, B, C, D of all the graduation periods P1–P8 are added together, so that a 0° signal PA, a 90° signal PB, a 180° signal PC, and a 270° signal PD are generated. These four analog scanning signals PA, PB, PC, PD in phase quadrature are subdivided in an interpolation unit 9 in a known way, as a result of which an interpolation value Q is obtained, which is the absolute position within a graduation period P and which subdivides a length of one graduation period P into small measuring increments. Now the problem is that the interpolation value Q provides absolute unambiguous resolution for only a fraction of the length of one code element C2, or in other words the fraction of a measurement range. For unambiguous combination of the rough position value defined by the code word CW and the interpolation value Q to make one common absolute position measurement value, a further position determination is therefore necessary.

The present invention is now based on the discovery that for this purpose it is sufficient to observe the shift of one of the periods P1–P8 over the length of one code element C2—that is, the increment width of the absolute position measurement. To that end, within one of the graduation periods P1–P8, a reference marking R is provided. The detector arrangement 7.6 detects the motion of this reference marking R over the length of one code element C2.

The reference marking R is a partial interruption of the periodicity of the incremental graduation 6. This interruption, in this example, is a blackening of an intrinsically transparent location within the graduation period P1. The higher-order periodicity of the series of graduation periods P1–P8 is not interfered with by this partial interruption.

The detection of the shift in the reference marking R within the detector arrangement 7.6 over a length of one code element C2 is effected by evaluating the analog scanning signals of the detector elements A–D within P1–P8. These scanning signals in the first group of four A–D within the length of one code element C2 are designated as A1–D1, those of the second, next group of four A–D are designated as A2–D2, and those of the eighth group of four A–D are designated as A8–D8.

Figure 3:
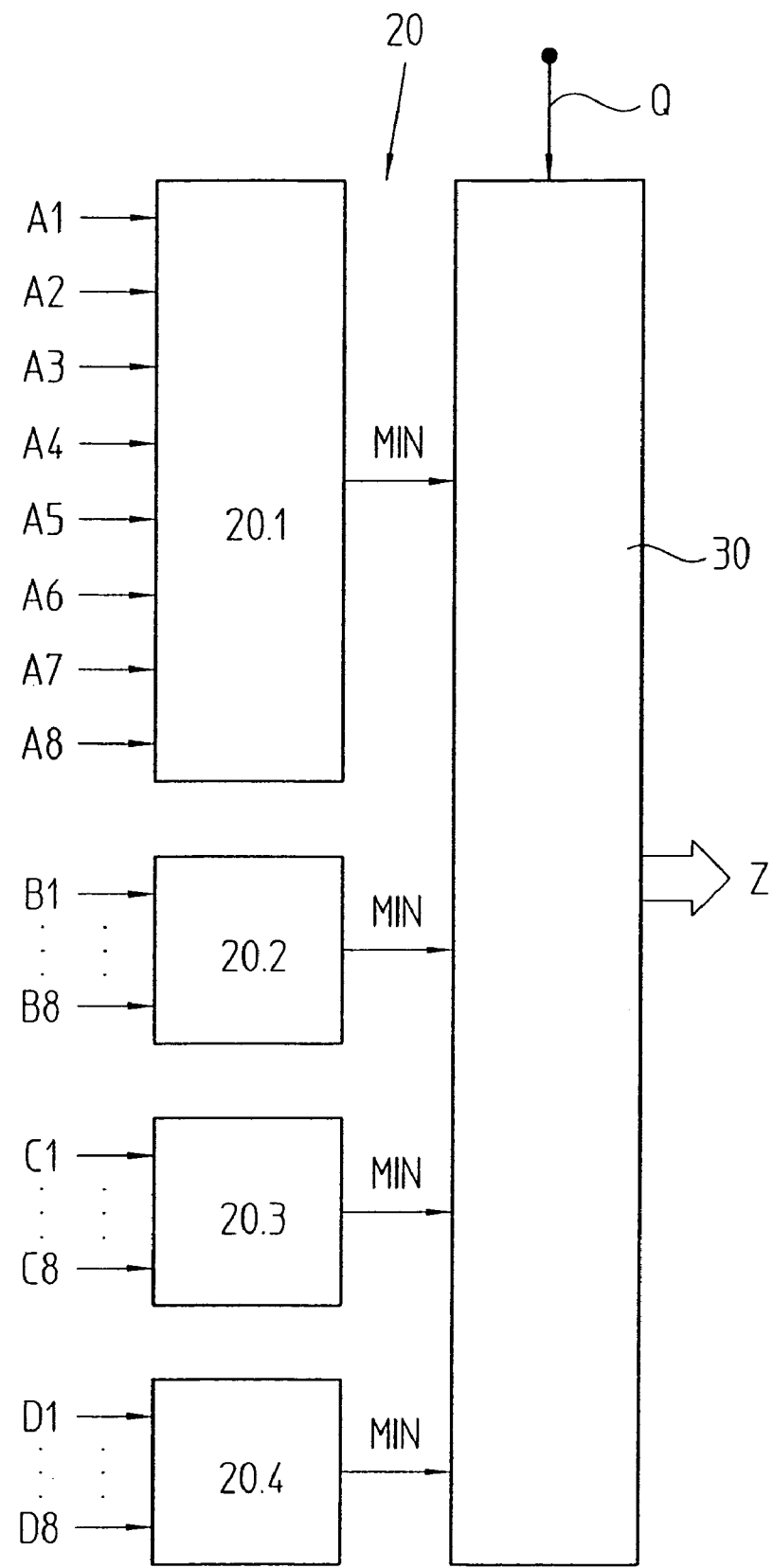
FIG. 3 schematically shows an embodiment of a device for evaluating the scanning signals of the position measuring instrument of FIG. 1 in accordance with the present invention.
Figure 4A:
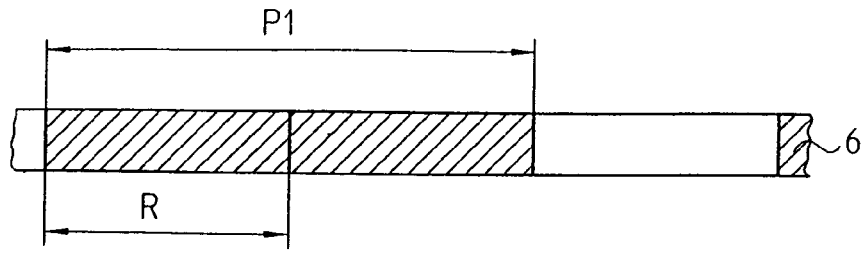
FIG. 4a shows a mode of scanning of the incremental track of FIGS. 1–2 in a first position in accordance with the present invention.
Figure 4B:
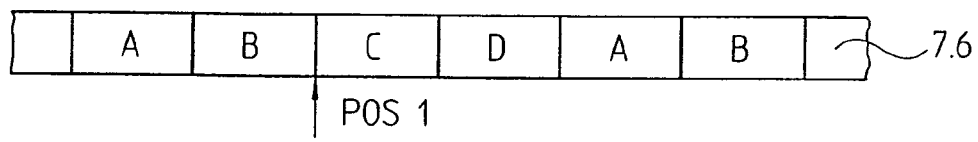
FIG. 4b shows a mode of scanning of the incremental track of FIGS. 1–2 in a second position in accordance with the present invention.
Figure 4C:
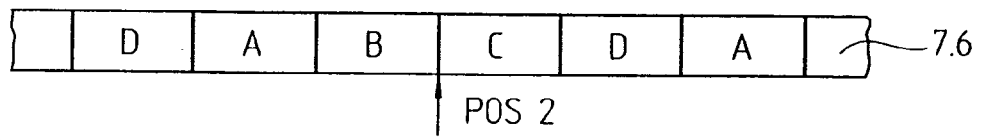
FIG. 4c shows a mode of scanning of the incremental track of FIGS. 1–2 in a third position in accordance with the present invention.
Figure 4D:
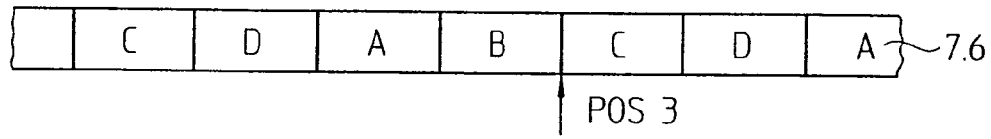
FIG. 4d shows a mode of scanning of the incremental track of FIGS. 1–2 in a fourth position in accordance with the present invention.

The reference marking R interferes with the continuous periodic course of the scanning signals A1–D8 at only a single location within a length of the code element C2, and the location of this interference is ascertained in an evaluation unit 20 shown in FIG. 3. The particular group of four 1–8 of detector elements A, B, C, D in which the interference is located is detected; that is, one of the eight detector regions 1–8 is defined unambiguously. In other words, this detection determines an absolute position value Z with a medium resolution, such that the combination of CW and Z as well as Q yields an unambiguous absolute position.

With the position measuring instrument designed according to the present invention, a coarse absolute position value defined by the code word CW with a first increment width can thus be determined. This increment width is furthermore resolved in absolute form by scanning the incremental graduation 6. The scanning signals A1–D8 are processed in the evaluation unit 8 (FIG. 1) in such a way that a mean absolute value Z with a second increment width is ascertained, along with a fine interpolation value Q with a third increment width, which in turn resolves the second increment width absolutely and more finely.

Figure 5:
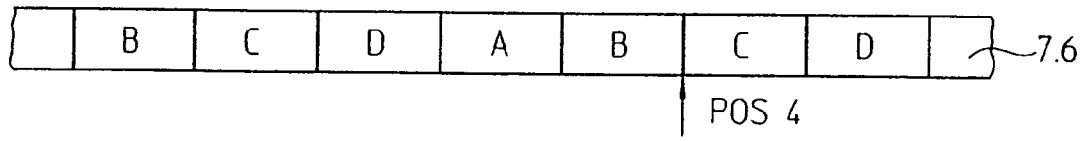
FIG. 5 shows a table of association for evaluating the scanning signals of the incremental track of FIGS. 1–2 in accordance with the present invention.

From FIGS. 3–5, one possible way of determining the position value Z will be further explained. Since the reference marking R is blackening, position-dependent scanning signals A1–D8 within a single group 1–8 are varied by reducing the amplitude. A determination circuit 20 is provided for finding this detector group 1–8. This determination circuit 20 includes a first component 20.1, to which in-phase scanning signals A1–A8 of the eight groups 1–8 are delivered. The component 20.1 determines which scanning signal from A1–A8 has the minimal amplitude. In the same way, in further components 20.2, 20.3 and 20.4, the minimum scanning signals from B1–B8, C1–C8, and D1–D8 are determined.

To enable this determination in every position within a graduation period P1 with great certainty, the following provision is especially advantageous:

It is known that within one graduation period P1, a variation R in the periodicity is incorporated only in part. A control unit 30 is now provided, which assures that within one graduation period P1–P8, it is always the in-phase scanning signals of groups 1–8 in which the signal interference is in every case contained in the form of the maximum amplitude reduction that are compared with one another. For explaining this subject matter, in FIGS. 4a–4d, four different positions POS1–POS4 of the detector arrangement 7.6 relative to the incremental graduation 6 are shown. In the first position POS1, the detector element A and B is located facing the reference marking R, so that within the in-phase scanning signals A1–A8 and the in-phase scanning signals B1–B8, a single one of the scanning signals has the greatest difference in amplitude from the other seven scanning signals. For ascertaining the position Z, the component 20.1 is thus used in position POS1. FIG. 5 shows which detector elements A, B, C, D and scanning signals are used in which position POS1–POS4. Since within each position POS1–POS4, two detector elements A, B, C, D and scanning signals can be used, it is also possible in this example to generate redundant information. The positions POS1–POS4 within one graduation period P1–P8 are unambiguously determined by the interpolation value Q.

For better explanation of the principle of the invention, the detector arrangements 7.5, 7.6 in FIG. 2 extend over only the length of one code element C2. For forming the code word CW, a plurality of code elements C1, C2, C3 must be scanned simultaneously, so that in practice, the detector arrangement 7.5 extends over a plurality of code elements C1, C2, C3. This space can now also be used advantageously for scanning the incremental graduation 6, by repeating the arrangement of the eight detector groups 1–8 multiple times in the measurement direction X. By adding together in-phase scanning signals of groups 1–8 in the various arrangements, the signal generation is made relatively invulnerable to partial soiling. Scanning the reference marking R also becomes very invulnerable to soiling or contamination, since it is scanned multiple times over the entire scanning range, and therefore soiling of one reference marking R does not yet cause any signal failure.

Figure 6:
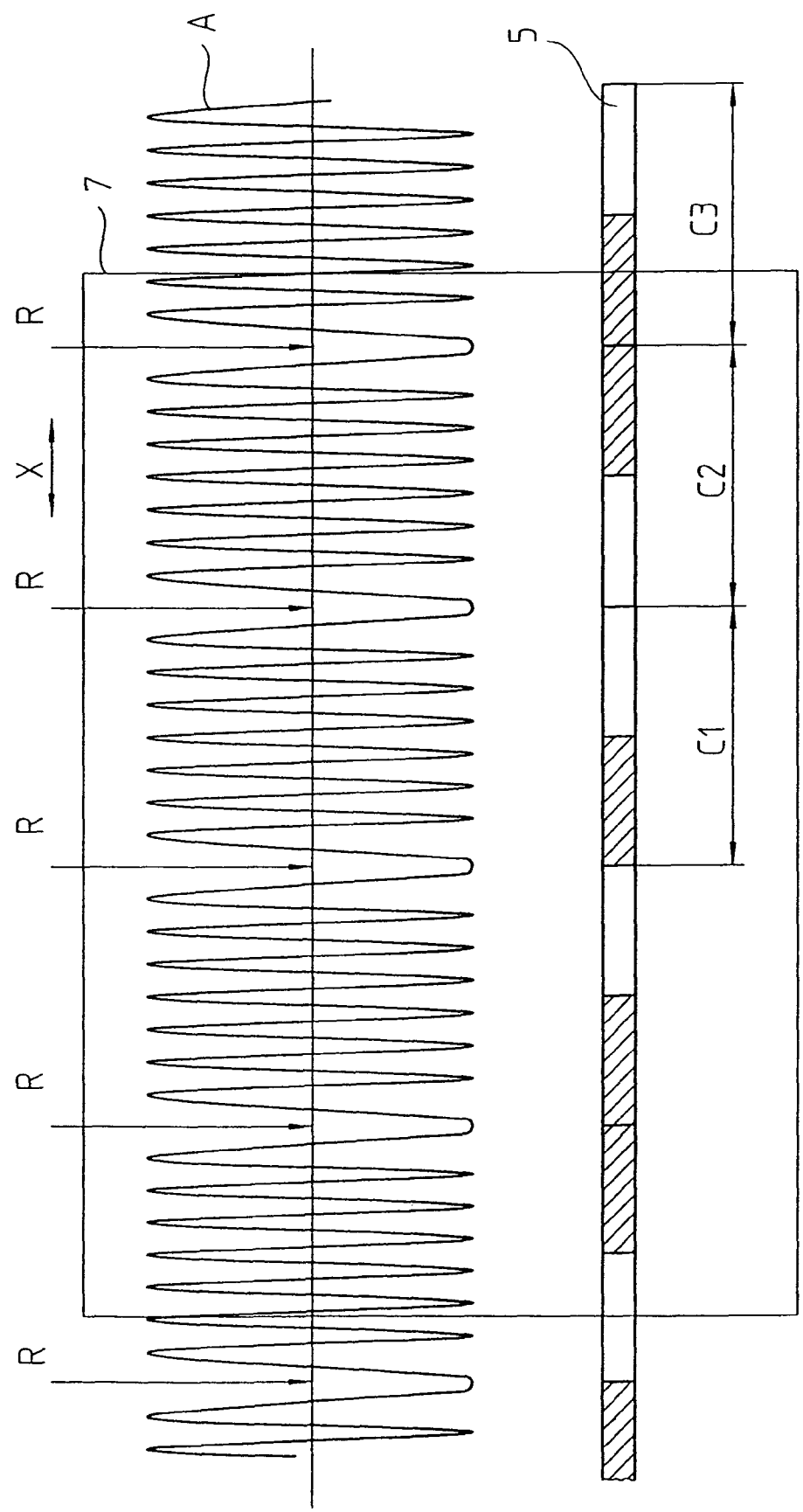
FIG. 6 shows an embodiment of a scanning region with the code track and the scanning signals of the incremental graduation that are associated with the code track in accordance with the present invention.

In FIG. 6, the principle of this multiple scanning is illustrated. Within the length of the scanning field 7, the reference marking R is scanned four times. The length of the scanning field 7 is selected as four times the spacing of the reference marking R so that in every position, an equal number of reference markings R will be scanned. In FIG. 6, one of the analog scanning signals A is shown.

An advantageous disposition and evaluation of the code 5 will now be described in further detail.

Figure 7:
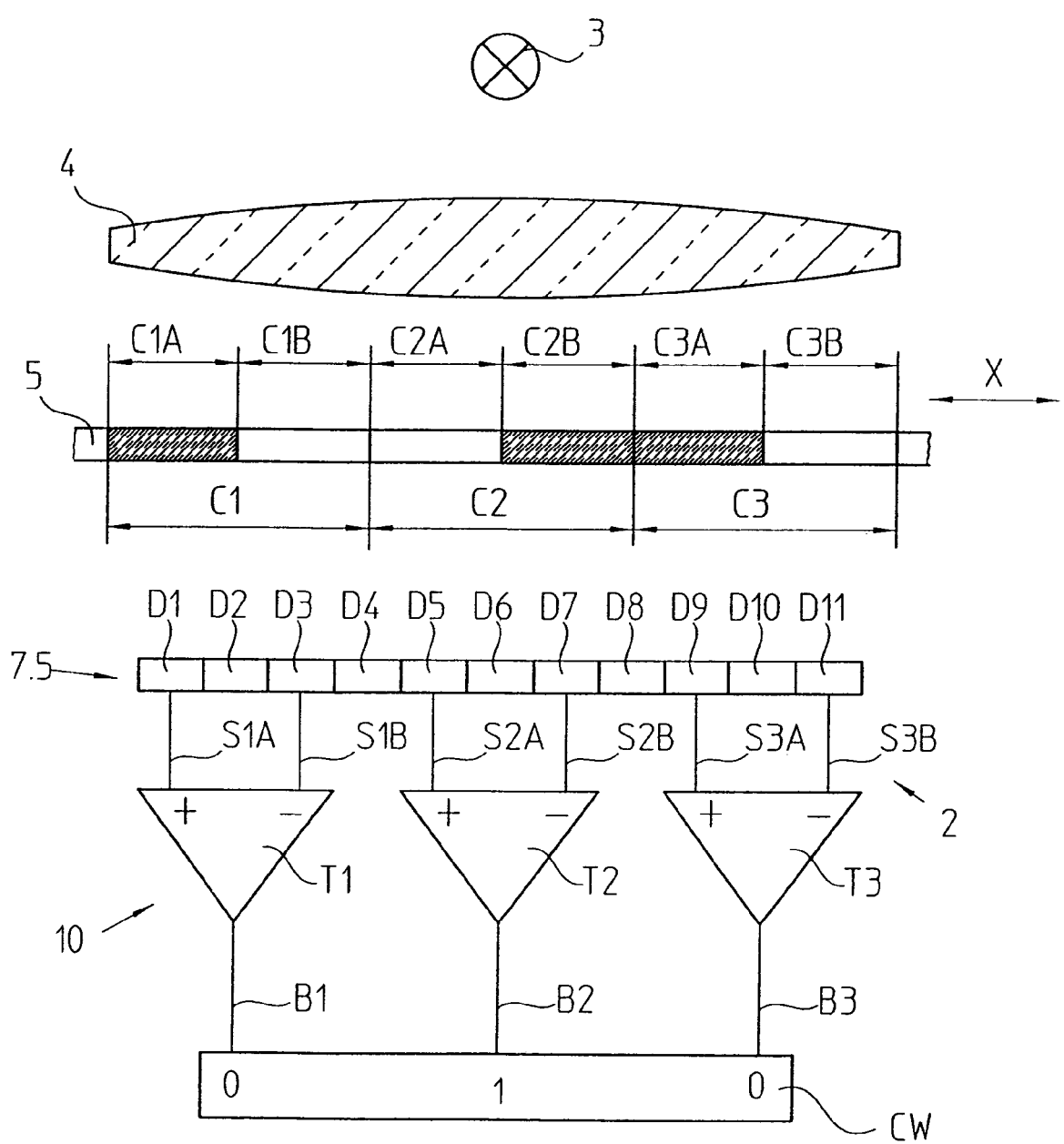
FIG. 7 shows a principle of scanning the code track of the position measuring instrument of FIGS. 1–2 in accordance with the present invention.
Figure 8:
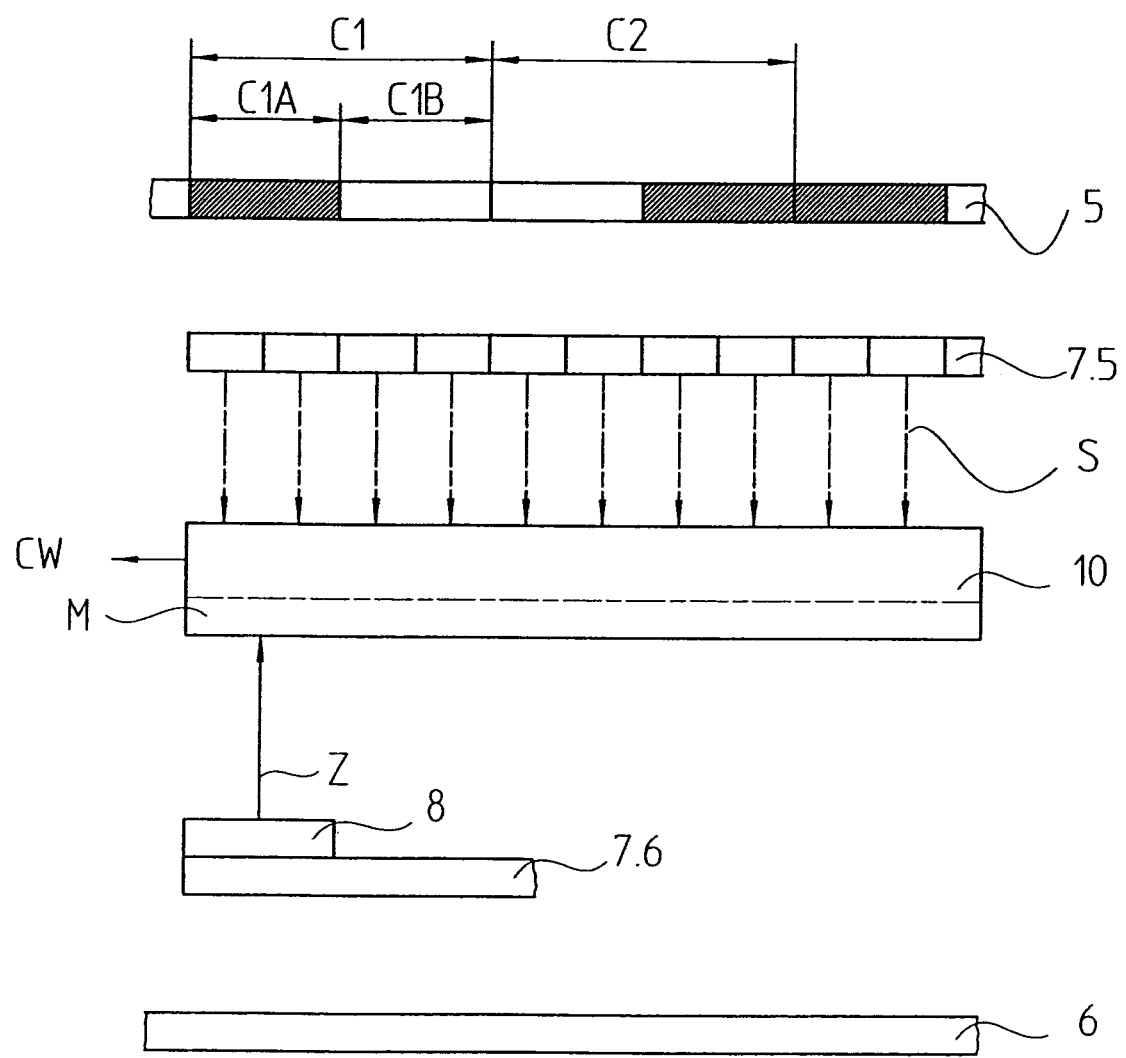
FIG. 8 shows a mode of generation of a control signal from the incremental track for scanning the code track of FIGS. 1–2.

FIG. 7 shows an instantaneous position of the code 5 relative to the scanning device 2. The detector elements D1–D11 are disposed in succession, at a spacing of half the width of one partial region C1A–C3B of the code 5. This assures that in every position, at least one detector element D1–D11 is unambiguously associated with one partial region C1A–C3B and does not scan a transition between two partial regions C1A–C3B. In the position shown, the partial region C1A is being scanned by the detector element D1, while the partial region C1B is being scanned by the detector element D3. The detector elements D1, D3 detect the light distribution, and as a function of the light intensity, they generate an analog scanning signal S1A, S1B in proportion to the light intensity. Since the two partial regions C1A and C1B are embodied as complementary to one another, the intensity of the scanning signals S1A and S1B is also inverse to one another; that is, the signal levels are spaced far apart from one another.

This signal spacing is now utilized to generate the binary information B1, by checking which of the two scanning signals S1A, S1B of the code element C1 is the greater. This checking can be done by division or subtraction. In this example, subtraction is used, for which purpose, a trigger component T1 serves as a comparison device in FIG. 7. The trigger component T1 generates B=0 if S1A is less than S1B, and it generates B1=1 if S1A is greater than S1B. In the same way, binary data B2 and B3 are obtained by scanning the code elements C2, C3 and comparing the analog scanning signals S2A, S2B; S3A, S3B of the partial regions C2A, C2B; C3A, C3B of each code element C2, C3 by trigger components T2, T3.

Thus a first digital value is assigned to a first sequence of the complementary partial regions C1A, C1B; C2A, C2B; C3A, C3B, and a second digital value is assigned to a second sequence of the complementary partial regions C1A, C1B; C2A, C2B; C3A, C3B. In this example, the value 0 is assigned to the sequence opaque→transparent, and the value 1 is assigned to the sequence transparent→opaque.

Since the two partial regions C1A, C2A, C3A on the one hand and C1B, C2B, C3B on the other of each code element C1, C2, C3 are complementary to one another, the signal-to-noise ratio of the scanning signals S is very high. A variation in the light intensity of the light source 3 affects the scanning signals S of both partial regions C1A, C1B; C2A, C2B; C3A, C3B equally.

Because of the complementary design of each two partial regions C1A, C1B; C2A, C1A, C3A, C3B of a code element C1, C2, C3, analog signals S whose difference exceeds a predetermined value must be generated in each case from scanning of these partial regions C1A, C1B; C2A, C2B; C3A, C3B, if the position measuring instrument is functioning correctly. By observation of this differential value, good error checking is possible. The basis of this error checking is that it can be assumed that if the differential value fails to be attained by a predetermined amount, the binary information B1, B2, B3 is uncertain, and for that binary information B1, B2, B3, an error signal is therefore generated.

The principle of error checking will now be briefly explained. The analog scanning signals S1A and S1B of the code element C1 are delivered to an error checker. The error checker compares S1A and S1B by subtraction (S1A–S1B) and checks whether the amount of the difference exceeds a predetermined comparison value, or not. If the differential amount (S1A–S1B) does not exceed the predetermined comparison amount, an error signal is output.

Taking the detector elements D1 and D2 as an example, it is clearly apparent from FIG. 7 that upon a shift in the code 5 by the length of one partial region C1A, C1B; C2A, C2B; C3A, C3B to the left, the detector element D1 scans the partial region C1B, while the detector element D3 scans the partial region C2A, or in other words partial regions of two code elements C1, C2 are scanned. The trigger component T1 is therefore unable to furnish binary information B1, B2, B3 that is assigned to one code element C1, C2, C3. Provisions will now be explained with which it is assured that for generating code words, the correct detector elements D1–D11 will be used, or in other words the detector elements D1–D11 that each scan the partial regions of a single code element C1, C2, C3.

From FIGS. 8 and 9a–9d, a preferred provision for this will now be described. As already explained, the incremental graduation 6 is disposed parallel to and next to the code 5. By the position value Z, a distinction between the right and left partial region C1A, C1B; C2A, C2B; C3A, C3B of one code element C1, C2, C3 can now easily be made. The position value Z defines the order of the partial regions C1A, C1B; C2A, C2B; C3A, C3B unambiguously and serves as a control signal for defining those detector elements D1–D11 from which a correct code word CW can be generated. That is, the control signal Z defines which scanning signals S will be compared with one another, and from which scanning signals S digital values B1, B2, B3 for the code word CW can be obtained.

To further explain this method, in FIGS. 9a–9d four different positions of the code 5 relative to the detector arrangement 7.5 are shown. The detector elements D1–D11 are disposed in the measurement direction X at spacings equivalent to half the length of one partial region C1A, C1B; C2A, C2B; C3A, C3B, and two detector elements D1–D11 each, which are disposed at a mutual spacing in accordance with the length of one partial region C1A, C1B; C2A, C2B; C3A, C3B, are connected in difference.

Figure 9A:
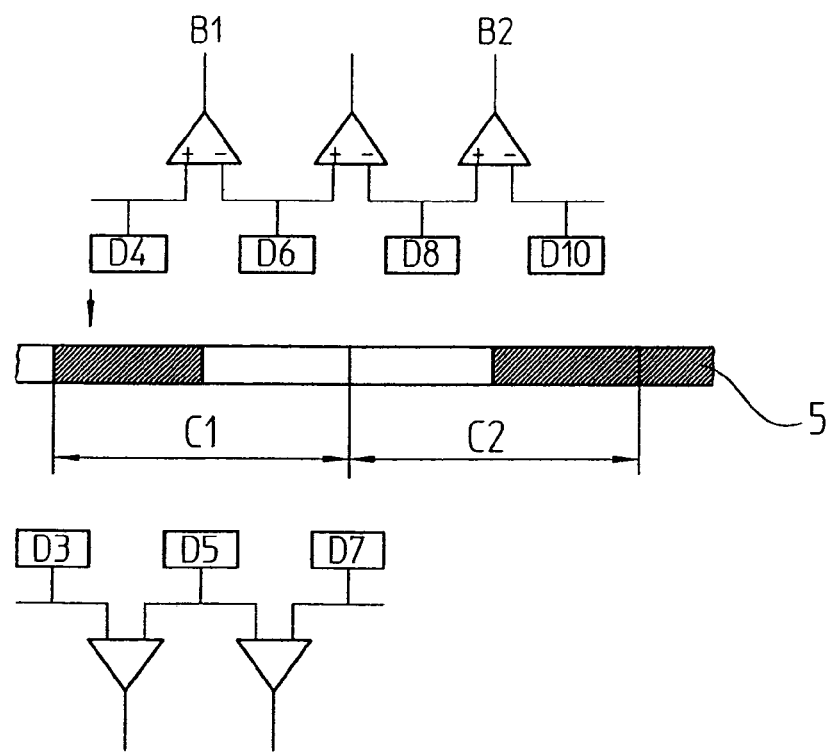
FIG. 9a shows a possible first scanning position for scanning the code track of FIGS. 1–2 and 7 in accordance with the present invention.

In FIG. 9a, the first position is shown. A control unit M, as a function of the position information Z, selects the detector elements D4 and D6. The bit B1 of the code element C1 is formed by subtraction from detector elements D4 and D6, or in other words from (D4–D6).

Figure 9B:
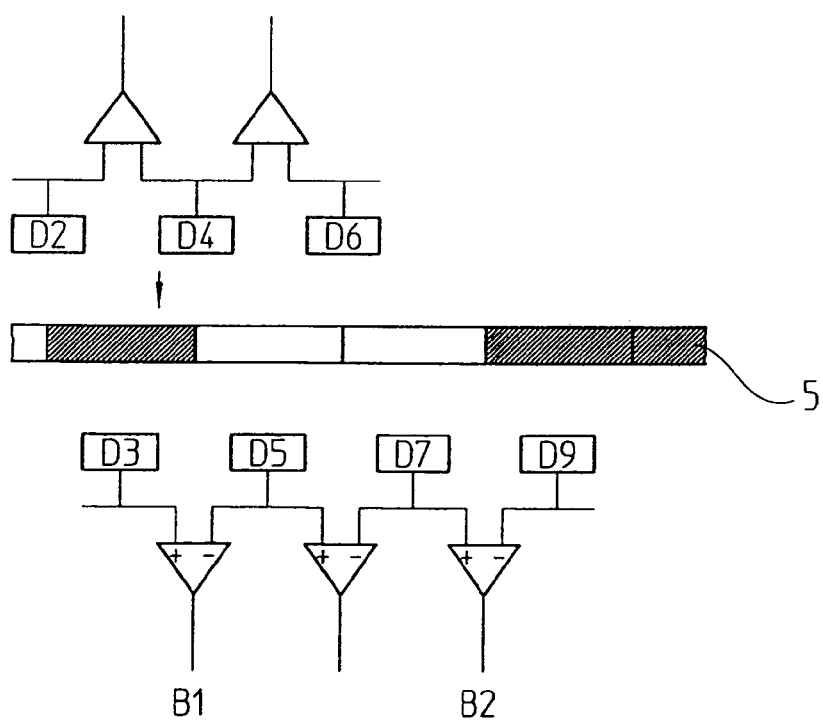
FIG. 9b shows a possible second scanning position for scanning the code track of FIGS. 1–2 and 7 in accordance with the present invention.
Figure 9C:
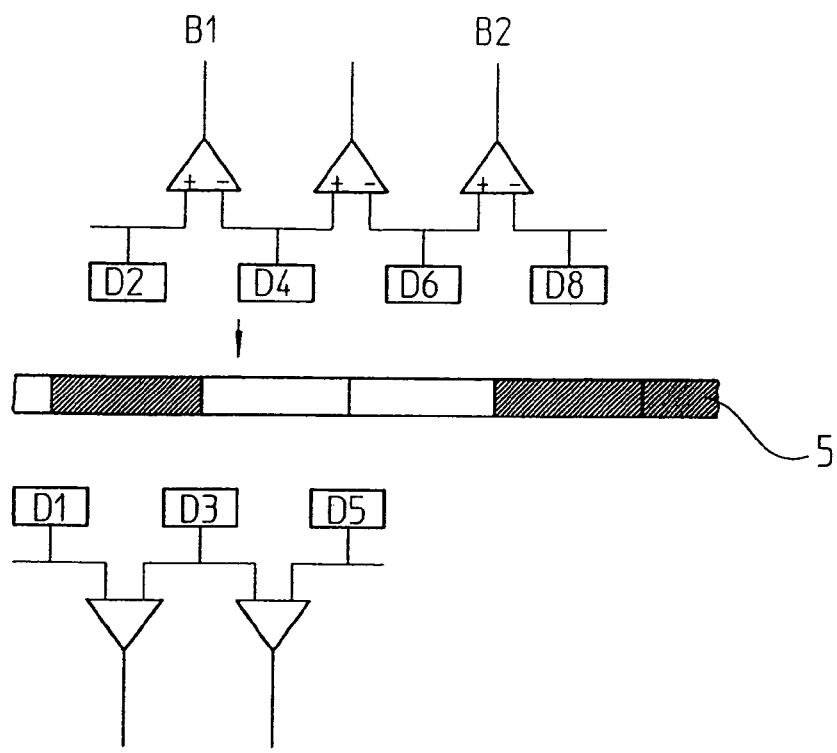
FIG. 9c shows a possible third scanning position for scanning the code track of FIGS. 1–2 and 7 in accordance with the present invention.

In the second position in FIG. 9b, the control unit M selects the detector elements D3 and D5. In the third position in FIG. 9c, the detector elements D2 and D4 are selected for subtraction by the control unit M. In the fourth position in FIG. 9d, the detector elements D1 and D3 are selected.

In the same way, the correct detector elements are ascertained for forming the further bits B2, B3 of the code word CW. For instance, if for forming the bit B1 the detector elements D1 and D3 were selected, then to form the bit B2, the detector elements D5 and D7 are selected, and for forming the bit B3, the detector elements D9 and D11 are selected, as shown in FIG. 7. In FIG. 7, only the trigger components T1, T2, T3 used in this instantaneous position are shown.

Figure 9D:
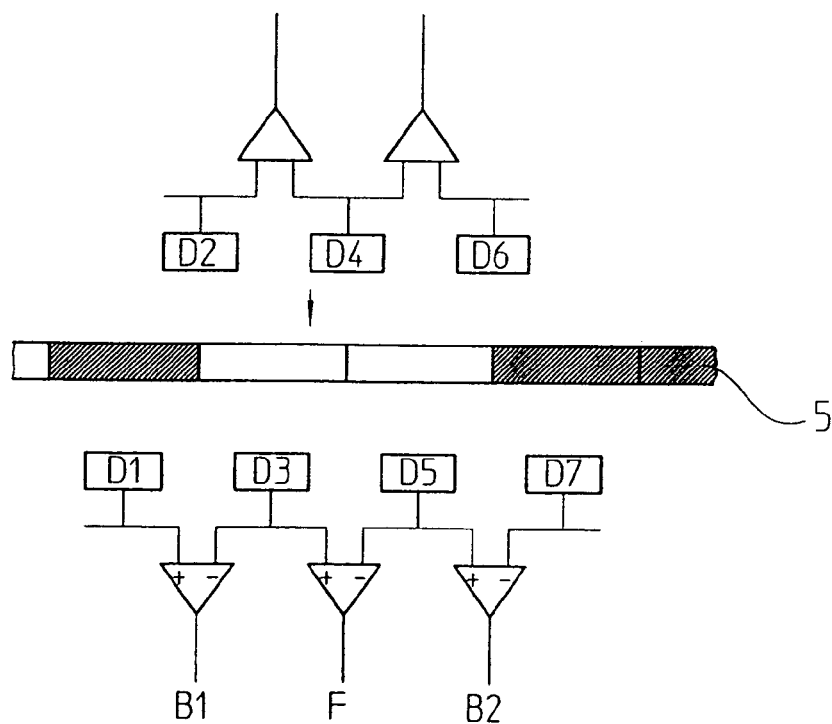
FIG. 9d shows a fourth scanning position for scanning the code track of FIGS. 1–2 and 7 in accordance with the present invention.

A further possible way of ascertaining the correct detector elements D1–D11 and the correct analog scanning signals S is for all the detector elements D1–D11, which are spaced apart from one another by the length of one partial region C1A, C1B; C2A, C2B; C3A, C3B, are compared with one another. The result, at the spacing of one code element C1, C2, C3, is now detector pairs D1, D3 and D5, D7—in the example of the instantaneous position shown in FIG. 9d-that in the desired way each scan the difference between the partial regions C1A, C1B; C2A, C2B; C3A, C3B of one code element C1, C2. The further detector pairs D3, D5 scans successive partial regions of two successive code elements C1, C2 and thus, by the error checking explained above, generate an error signal F. In order now to ascertain the correct detector elements D1–D11, the detector group D1, D3; D5, D7 in which the fewest error signals occur is looked for. In detail, for performing this second possible provision, the following arrangement and the following method steps are needed:

Detector elements D1–D11 are disposed in the measurement direction X at intervals equivalent to half the length of one partial region C1A, C1B; C2A, C2B; C3A, C3B;

the detector elements D1–D11 form a first group (in FIGS. 9a–9d, the even-numbered detector elements D2, D4, D6, D8, D10) with a mutual spacing equivalent to the length of one partial region C1A, C1B; C2A, C2B; C3A, C3B;

the detector elements D1–D11 form a second group (in FIGS. 9a–9d, the odd-numbered detector elements D1, D3, D5, D7, D9) with a mutual spacing equivalent to the length of one partial region C1A, C1B; C2A, C2B; C3A, C3B;

the detector elements D2, D4, D6, D8, D10 of the first group are disposed offset from the detector elements D1, D3, D5, D7, D9 of the second group by half the length of one partial region C1A, C1B; C2A, C2B; C3A, C3B;

detector elements immediately succeeding one another in one group are each connected in difference;

of the two groups, the results of comparison of the pairs of detector elements are now used, in a grid corresponding to the length of one code element C1, C2, C3, to form the code word CW whose series generates the fewest errors F; in FIG. 9d, this is the series (D1–D3)=B1(D5–D7)=B2, etc.

The two partial regions C1A, C1B; C2A, C2B; C3A, C3B of each code element C1, C2, C3 can be embodied as scannable optically; in that case, one partial region is embodied as transparent or reflective to the scanning light, while the other partial region is embodied as opaque or nonreflective.

The present invention can be especially advantageously used with the optical scanning principle. However, the present invention is not limited to this scanning principle, but can also be used with magnetic, inductive and capacitive scanning principles.

The position measuring instrument can be used for measuring linear or rotary motions. The objects to be measured can be the table and carriage of a machine tool, a coordinate measuring machine, or the rotor and stator of an electric motor.

Further exemplary embodiments exist within the scope of the present invention besides the described examples.

I claim:

1. A position measuring instrument, comprising:
a periodic incremental graduation comprising a plurality of graduation periods within one measurement range;
a reference marking disposed within said measurement range and integrated with said incremental graduation;
an arrangement of detector elements positioned over at least a length of said measurement range and used for scanning said periodic incremental graduation over at least said length of said measurement range for generating a plurality of periodic scanning signals of which at least one is modified locally by said reference marking and is associated with one of said detector elements; and
an evaluation device that receives said periodic scanning signals, determines a first absolute position within one of said plurality of graduation periods and detects said at least one scanning signal, modified by said reference marking, from said plurality of periodic scanning signals and determines a second absolute position of said reference marking within said length of said measurement range while said at least one scanning signal modified by said reference marking defines one specific location of said one of said detector elements.

2. The position measuring instrument of claim 1, wherein within said measurement range, N graduation periods are disposed, where N>1 and is an integer;
said arrangement of detector elements over said length of said measurement range forms N groups, and each of said N groups of detector elements extends over said length of one graduation period;
within each of said N groups, a plurality of detector elements are spaced apart from one another by a fraction of one graduation period, so that, within one of said N groups, a plurality of periodic scanning signals phase-offset from one another are generated.

3. The position measuring instrument of claim 2, wherein in-phase scanning signals of all of said N groups are added together to form a common summation signal.

4. The position measuring instrument of claim 3, wherein said common summation signal is delivered to an interpolation unit for determining said first absolute position within one graduation period.

5. The position measuring instrument of claim 2, wherein in-phase scanning signals of said N groups are delivered to said evaluation unit, which compares respective in-phase scanning signals with one another and from said comparison said evaluation unit determines one scanning signal for one of said N groups which is modified by said reference marking, and said one of said N groups determines said one specific location of said one of said detector elements within said length of said measurement range.

6. The position measuring instrument of claim 5, wherein said reference marking is an interference in periodicity at one location within one graduation period of said incremental graduation, and in-phase scanning signals, determined as a function of said location of said interference within said one graduation period, of detector elements of said N groups that scan said one specific location within each of said N graduation periods are compared with one another.

7. The position measuring instrument of claim 5, wherein said respective in-phase scanning signals to be compared with one another for determining said position are determined by said first absolute position that is formed by said interpolation unit.

8. The position measuring instrument of claim 1, wherein said reference marking is a variation of an interstice in a series of equally-spaced markings which forms said incremental graduation.

9. The position measuring instrument of claim 1, further comprising a second reference marker, wherein said length of said measurement range is an integral multiple of the spacing between said reference marking and a second reference marking.

10. The position measuring instrument of claim 1, wherein parallel to and next to said incremental graduation, an absolute code for absolute position measurement is disposed at measurement increments in accordance with said length of one measurement range.

11. The position measuring instrument of claim 10, wherein said absolute code is a single-track sequential code with successive code elements.

12. A method for position measurement, comprising:
scanning a plurality of graduation periods of one incremental graduation by a detector arrangement comprising a plurality of detector elements and extending over a length of one measurement range, a reference marking being integrated with one of said graduation periods within said length of said measurement range, and generating a plurality of periodic scanning signals, of which at least one of said plurality of periodic signals is locally modified by said reference marking and is associated with one of said detector elements;

determining a first absolute position within one of said graduation periods;

detecting said at least one periodic scanning signal, modified by said reference marking, from among said plurality of periodic scanning signals; and determining a second absolute position of said reference marking within said length of said measurement range while said at least one scanning signal modified by said reference marking defines one specific location of said one of said plurality of detector elements.

13. The method of claim 12, wherein said scanning results in the generation of a plurality of scanning signals phase-offset from one another within each graduation period of said measurement range.

14. The method of claim 13, wherein scanning signals in-phase with one another in all said graduation periods are added together to form a common summation signal.

15. The method of claim 14, wherein said common summation signal is delivered to an interpolation unit, and said first absolute position within one graduation period is ascertained.

16. The method of claim 13, wherein said scanning signals in-phase with one another are compared with one another, and from said comparison, said scanning signal whose amplitude is modified by said reference marking is determined.

17. The method of claim 15, wherein said scanning signals within one graduation period that are to be compared with one another are determined by said first absolute position.

18. The position measuring instrument of claim 1, wherein each one of said detector elements is assigned to its own corresponding location within said length of said measurement range and said second absolute position of said reference marking determined by said evaluation device is one of said corresponding locations of said detector elements within said length of said measurement range.

19. The method of claim 12, wherein each one of said plurality of detector elements is assigned to its own corresponding location within said length of said measurement range, and said second absolute position of said reference marking is one of said corresponding locations of said plurality of detector elements within said length of said measurement range.

* * * * *